United States Patent [19]

Proksa et al.

[11] Patent Number: 4,904,451
[45] Date of Patent: Feb. 27, 1990

[54] PROCESS AND DEVICE FOR THE PREPARATION OF FLOWABLE REACTION MIXTURES

[75] Inventors: Ferdinand Proksa, Leverkusen; Hans-Michael Sulzbach, Koenigswinter; Ferdinand Althausen, Neunkirchen; Reiner Raffel, Siegburg, all of Fed. Rep. of Germany

[73] Assignee: Maschinenfabrik Hennecke GmbH, Leverkusen, Fed. Rep. of Germany

[21] Appl. No.: 393,172

[22] Filed: Aug. 14, 1989

[30] Foreign Application Priority Data

Aug. 18, 1988 [DE] Fed. Rep. of Germany ....... 3828061

[51] Int. Cl.⁴ ............................................. B05B 1/08
[52] U.S. Cl. .................... 422/133; 422/112; 366/159; 239/124; 239/412
[58] Field of Search ............ 366/136, 137, 159; 422/133, 112; 425/145, 146; 251/63, 62, 31, 32; 239/533.3, 533.4, 124, 412

[56] References Cited

U.S. PATENT DOCUMENTS

| | | | |
|---|---|---|---|
| 3,706,515 | 12/1972 | Keuerleber et al. | 424/4 |
| 4,141,470 | 2/1979 | Schulte et al. | 222/137 |
| 4,378,335 | 3/1983 | Boden et al. | 422/112 |
| 4,399,104 | 2/1979 | Coblenz et al. | 422/111 |
| 4,440,500 | 4/1984 | Schneider | 422/133 |
| 4,490,048 | 12/1984 | Schlueter | 422/133 |

Primary Examiner—Michael S. Marcus
Assistant Examiner—Janelle D. Waack
Attorney, Agent, or Firm—Joseph C. Gil

[57] ABSTRACT

In order to keep the reversing times from circulation of the reaction components to mixing and vice versa as short as possible for the purpose of good mixing in the initial and end phases in the preparation of flowable reaction mixtures by high-pressure mixing, the holding pressure applied to the flow reversing element is maintained by a releasable non-return valve until the full hydraulic reversing pressure has built up on the opposite side, and only then is the non-return valve released.

2 Claims, 3 Drawing Sheets

PROCESS AND DEVICE FOR THE PREPARATION OF FLOWABLE REACTION MIXTURES

BACKGROUND OF THE INVENTION

The present invention relates to a process and a device for the preparation of flowable reaction mixtures from at least two reaction components. The components are mixed under high pressure. When the components are not being mixed, they are recirculated. The reversal back and forth between mixing and recirculating is effected by at least one flow reversing element which can be operated hydraulically.

The use of flow reversing elements in mix heads is generally known. Typical are the mixing devices or mix heads in which flow can be reversed by means of a flow reversing element, for example, those with a circulation or a so-called "straight" mix head. Depending on the construction, the flow reversing element can have various forms in conventional mixing devices or mix heads. In control piston mix heads (U.S. Pat. No. 3,706,515), the flow of the reaction components can be reversed by means of the control piston. If the reversing is effected via injection nozzles, the injection nozzles themselves represent the flow reversing element (U.S. Pat. No. 4,399,104). Finally, use of shut-off valves in the return (or recirculation) lines is also known. Such valves are typically located in the feed lines upstream of the mix head (U.S. Pat. No. 4,141,470).

These processes and devices are used in the polyurethane industry, and more particularly for the production of moldings in closed molds. During preparation of the reaction mixture (called the "shot" in the art), mixing disturbances occur at the start and end of the mixing operation because the injected jets of components initially stabilize at the start of the shot and then collapse at the end of the mixing operation. Even with high throughputs, small portions of unmixed or incompletely mixed components cause defects in the end product. If these defects appear on visible surfaces, the molding cannot be used or must at least be touched up. The shorter the flow reversing phases, the less such mixing disturbances occur.

One object of the present invention was to minimize the flow reversing phases mentioned using the simplest means possible.

DESCRIPTION OF THE INVENTION

The above noted object is achieved by a procedure in which during the flow reversing phase, the hydraulic holding pressure applied to the flow reversing element is maintained until the full hydraulic reversing pressure has built up on the opposite side, and only then is the hydraulic holding pressure released suddenly. The result of this is that the flow reversing element is not moved prematurely, as was previously the case because of the inertia of the hydraulic system.

The new process can be used with substantially any mixing device or mix head in which flow of the components can be reversed by means of a flow reversing element. Thus, the process can be used with control piston mix heads, mix heads where the flow reversal is effected via the injection nozzles, and mix heads where shut-off valves are located in the return lines.

The new device is based on a mix head which contains a mixing chamber into which feed lines end via jet bores. The feed lines can be connected via at least one flow reversing element to return lines. The flow reversing element has a hydraulic cylinder with a hydraulic piston which can be charged alternately on both sides. The hydraulic lines lead from the hydraulic chambers thus formed to a hydraulic on-off valve. The novelty resides in providing a non-return valve, which can be released by the build-up of the reversing pressure in the other hydraulic line, in each of the hydraulic lines. By this simple expedient, it is possible to minimize the flow reversing times. Such non-return valves are commercially available. The control line required is generally a hydraulic pulse line. However, an electrical control line with an additional pressure sensor can also be used. The increased constructional cost in comparison with the conventional devices is comparatively low and amortizes itself within a short time by the avoidance of waste.

The invention will now be discussed with reference to the drawings which show the new device in three separate embodiments.

Figure 1:
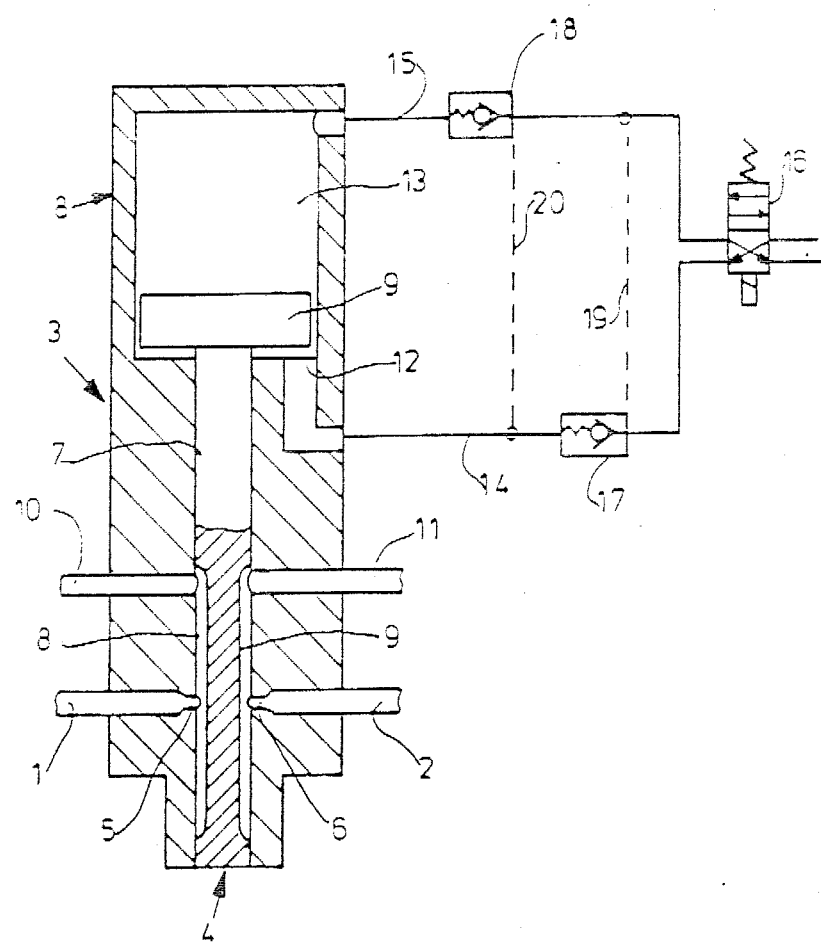
FIG. 1 shows an embodiment of the device of the present invention with a control piston mix head.

In FIG. 1, the device consists of reservoir tanks, which are not shown, from which component feed lines 1, 2 lead to a mix head 3 which contains a mixing chamber 4. The feed lines 1, 2 end in the mixing chamber via jet bores 5, 6. In the illustration, the mixing chamber 4 is filled from a control piston 7, which is the flow reversing element. The piston has control grooves 8, 9. In the position shown for the control piston 7, the control grooves connect the feed lines 1, 2 to return lines 10, 11, which lead back to the reservoir tanks. In the mixing position (now shown), the control piston 7 is moved back to the extent that the jet bores 5, 6 are open to the mixing chamber 4. The control piston 7 is provided with a hydraulic piston 9 guided in a hydraulic cylinder 8, so that hydraulic chambers 12, 13, which are connected via hydraulic lines 14, 15 to a hydraulic reversing valve 16, are formed on both sides of the hydraulic piston 9. This reversing valve 16 is connected via a hydraulic pump, not shown, to a hydraulic reservoir (also not shown). In each of the two hydraulic lines 14, 15 are located non-return valves 17, 18 which can be released and which respond via a control line 19, 20 to the particular reversing pressure built up fully in the other hydraulic line 15 or 14. The position in which the reversing valve 16 has just reversed to the mixing operation is shown. Because of the holding pressure still being exerted, the control piston (which is the flow reversing element) is not moved until the non-return valve 18 receives the pulse for release when the fully built-up reversing pressure is reached in the hydraulic line 14. The reversing is effected suddenly, with the jet bores 5, 6 to the mixing chamber 4 being released.

Figure 2:
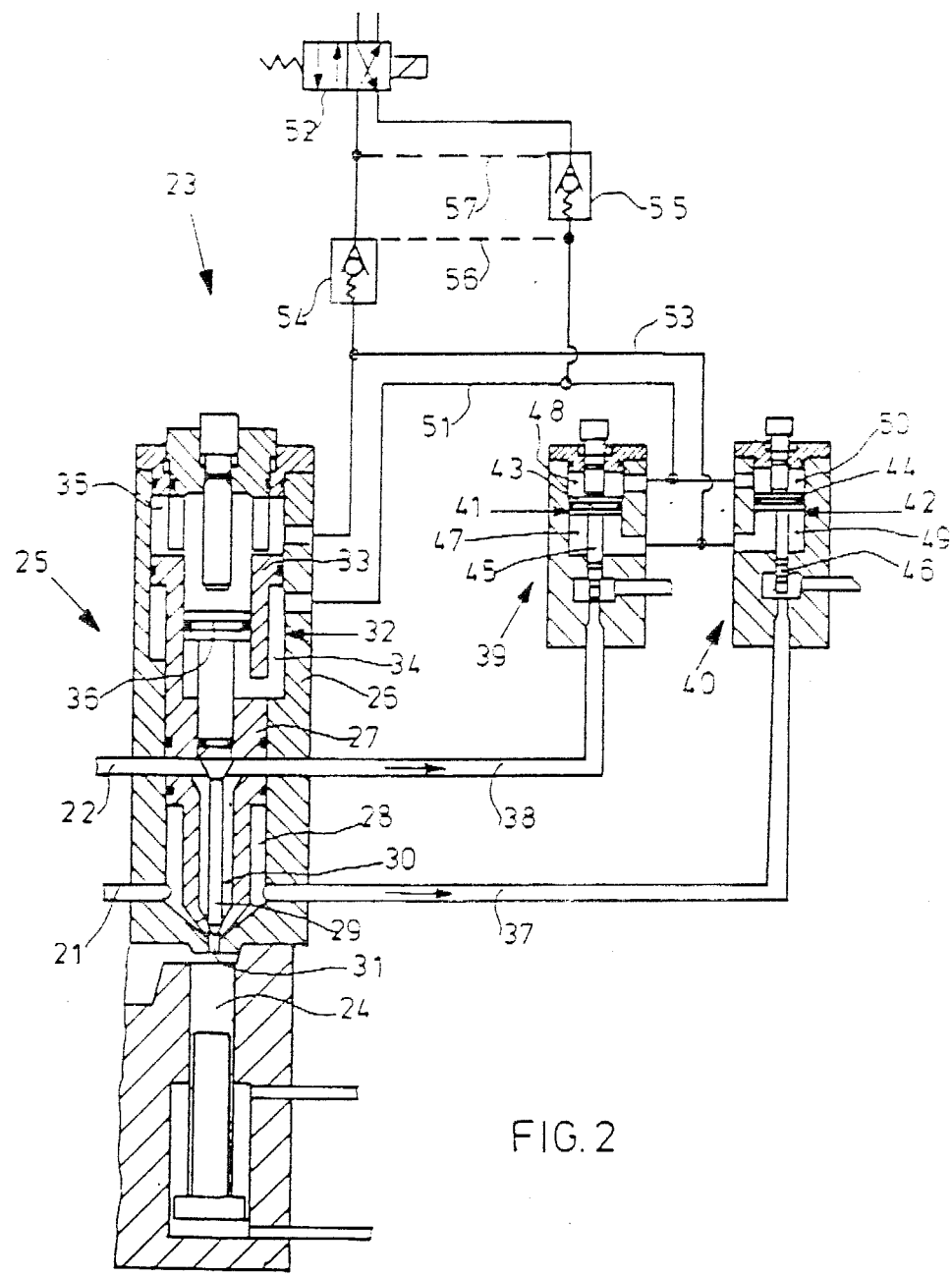
FIG. 2 shows an embodiment of the device of the present invention with a parallel flow mix head; and, FIG. 3 shows an embodiment of the device of the present invention with injection nozzles.

In FIG. 2, the device consists of reservoir tanks, which are not shown, from which component feed lines 21, 22 lead to a mix head 23 which has a mixing chamber 24. The feed lines 21, 22 end in a two-component jet 25. This consists of a housing 26 and a needle bushing 27, and a chamber 28 located between these. The feed line 21 ends in the chamber 28. An injector needle 29 forms between itself and the needle bushing 27 a chamber 30 in which the feed line 22 ends. In the illustration, the needle bushing 27 and injector needle 29 close a jet bore 31 which points into the mixing chamber 24. The needle bushing 27 is guided in a hydraulic cylinder 32 by means of a hydraulic piston 33, whereupon two hydraulic chambers 34, 35 are formed. The injector needle 29 is likewise provided with a hydraulic piston which is guided in the needle bushing 27. Return lines 37, 38 in which hydraulic shut-off valves 39, 40 are located emerge from the housing 26. These likewise consist of hydraulic cylinders 41, 42 and hydraulic pistons 43, 44 with shut-off needles 45, 46. The hydraulic pistons 43, 44 in each case divide the hydraulic cylinders 41, 42 into two hydraulic chambers 47, 48 or 49, 50. A merging hydraulic line 51 leads from the hydraulic chambers 34, 48 and 50 to a hydraulic reversing valve 52 which is connected via a second hydraulic line 53 to the hydraulic chambers 35, 47 and 49. The reversing valve 52 is connected via a hydraulic pump to a hydraulic reservoir (both not shown). Nonreturn valves 54, 55 which can be released and which each respond via control lines 56, 57 to the reversing pressure building up in the other hydraulic line 53 or 51 are located in the hydraulic lines 51, 53. The two-component jet 25 together with the shut-off valves 39, 40 thus serves here as the flow reversing element. That position in which the reversing valve 52 has just reversed to charge the hydraulic line 51 in order to initiate a mixing operation is shown. In this procedure, the non-return valve 54 is only released from its holding pressure when the full reversing pressure has built up in the hydraulic line 51. As a result of the reversal, the needle bushing 27 and the injector needle 29 release the jet bore 31, while at the same time the shut-off needles 45, 46 shut off or interrupt the return lines 37, 38.

Figure 3:
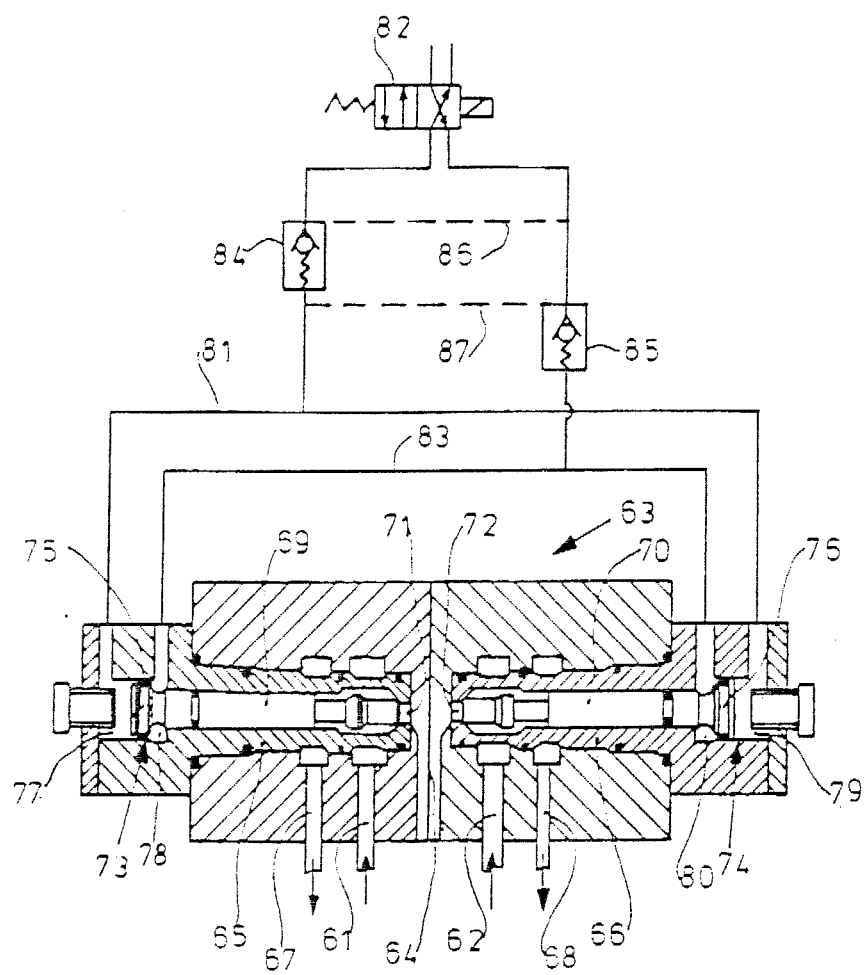

In FIG. 3, the device consists of reservoir tanks, which are not shown, from which component feed lines 61, 62 pass to a mix head 63 containing a mixing chamber 64. The feed lines 61, 62 end in the mixing chamber via injection nozzles 65, 66. These injection nozzles 65, 66 function as flow reversing elements in that return lines 67, 68 lead from them back to the tanks. The injector needles 69, 70 are constructed so that they connect the feed lines 61, 62 to the return lines 67, 68 or via jet bores 71, 72 to the mixing chamber 64. The injector needles 69, 70 have hydraulic cylinders 73, 74 in which hydraulic pistons 75, 76 are guided so that in each case two hydraulic chambers 77, 78 or 79, 80 are formed. A merging hydraulic line 81 passes from the hydraulic chambers 77, 79 to a reversing valve 82, and a merging hydraulic line 83 likewise passes from the hydraulic chambers 78, 80 to the reversing valve 82. This is connected via a hydraulic pump to a hydraulic reservoir (both now shown). Nonreturn valves 84, 85 which can be released and which in each case respond via control lines 86, 87 to the reversing pressure building up in the other hydraulic line 83 or 81 are located in the hydraulic lines 81, 83. That position in which the reversing valve 82 has just reversed for charging of the hydraulic line 83 is shown. The holding pressure which exists in the hydraulic line 81 is maintained until the full reversing pressure has built up in the hydraulic line 83. The non-return valve 84 is then given the order, via the control line 86, to release and the injector needles 69, 70 move suddenly into the mixing position and in this way expose the jet bores 71, 72 to the mixing chamber 64.

The reversing operation from shot to circulation proceeds in the reverse sequence in the three examples described.

What is claimed is:

1. In a process for the preparation of flowable reaction mixtures comprising at least two continuously flowing reaction components which are mixed under high pressure, in which the component mixing times alternate with non-mixing pauses during which each reaction component is separately recirculated, and wherein the change from recirculation to mixing and the change from mixing to recirculation are effected and maintained by the hydraulic operation of at least one flow directing element, wherein the improvement comprises that during redirection of the flowing reaction components the hydraulic pressure maintaining an initial position of said at least one flow directing element is held until the hydraulic pressure for positioning the flow directing element is built up to a predetermined value, and only then is the hydraulic pressure maintaining initial position released and the flow directing element simultaneously moved to the alternate position.

2. A device for the preparation of flowable reaction mixtures, wherein the device comprises a mix head containing a mixing chamber in which said mixing chamber at least two feed lines and corresponding return lines end via jet bores and the feed and return lines are connected for recirculation by at least one flow directing element wherein said flow directing element comprises a hydraulic cylinder containing a piston which separates said hydraulic chamber into two hydraulic chambers positioned on opposite sides of said piston wherein said piston is hydraulically charged alternately to two positions to allow mixing or recirculation of components from feedlines wherein the control of the piston positioning for mixing or recirculation comprises two hydraulic lines with a non-return valve in each line leading respectively from each of said hydraulic chambers thus forming a hydraulic control valve, and wherein a non-return valve is released after the build up of pressure to a predetermined value in the other hydraulic line.

* * * * *